United States Patent [19]

Kuroda

[11] 3,966,529

[45] June 29, 1976

[54] METHOD OF MAKING A PALLET

[76] Inventor: Shigeharu Kuroda, 5-1-13 Tomigaoka, Nara, 631, Japan

[22] Filed: Feb. 20, 1975

[21] Appl. No.: 551,508

Related U.S. Application Data

[63] Continuation-in-part of Ser. No. 343,024, March 20, 1973, abandoned.

[52] U.S. Cl................................... 156/300; 108/51; 156/305; 156/497; 156/499; 156/560

[51] Int. Cl.[2] .................... B32B 31/20; B32B 31/12; B32B 31/26; B65D 19/00

[58] Field of Search ........... 156/299, 300, 297, 556, 156/550, 560, 561, 562, 566, 580, 497, 498, 578, 305, 549, 499, 551; 108/51, 52, 53, 54, 55, 56, 57, 58

[56] References Cited

UNITED STATES PATENTS

| | | | |
|---|---|---|---|
| 3,047,050 | 7/1962 | Sourber | 156/497 |
| 3,126,843 | 3/1964 | DeLaney | 108/58 X |
| 3,133,850 | 5/1964 | Alenius | 156/560 X |
| 3,251,322 | 5/1966 | Downs et al. | 108/58 |
| 3,380,229 | 4/1968 | Nelson | 156/497 X |
| 3,625,803 | 12/1971 | Masulis et al. | 156/566 X |
| 3,699,902 | 10/1972 | Allgeyer et al. | 108/58 |
| 3,755,024 | 8/1973 | Grapin | 156/550 |

*Primary Examiner*—William A. Powell
*Assistant Examiner*—Thomas Bokan
*Attorney, Agent, or Firm*—Wenderoth, Lind & Ponack

[57] ABSTRACT

Connection beams and lateral plates are made separately in advance of fabrication. Two or more connection beams are simultaneously placed in parallel on an intermittently movable belt conveyor and lateral plates are then supplied thereto while the connection beams are moving on the belt conveyor. Both are joined together by the use of adhesives or by heat-melting. The bond is then secured by applying pressure.

7 Claims, 5 Drawing Figures

METHOD OF MAKING A PALLET

This is a continuation-in-part of application Ser. No. 343,024, filed Mar. 20, 1973, now abandoned.

BACKGROUND OF THE INVENTION

This invention relates to a method for fabricating pallets. Conventional box frames, concrete casting flasks or pallets that are made by joining connection beams and a number of lateral plates together have been made of wood or metal. In order to join the various parts, nails or metal pieces are conventionally used for wood pallets and welding or riveting is conventionally used for metal pallets. This work is substantially performed manually for each pallet. This manual method has required much work, much man-power, and much time, and has resulted in a lack of mass productivity and high costs.

Furthermore, in the case of joints held together by nails, the holding force is local and discontinuous. This weakpoint brings about a problem of instability of the quality. For example, the frame may collapse as a result of an impact force. On the other hand, when a pallet is made in one piece by synthetic resin injection molding, expensive equipment must be furnished, and it is difficult to embed reinforcements therein when required. As a result, it becomes impossible to achieve the required rigidity at low cost.

SUMMARY OF THE INVENTION

This invention is designed to remove these deficiencies. According to the invention, connection beams and lateral plates are made separately in advance of fabrication. Two or more of the connection beams are simultaneously placed in parallel on an intermittently movable belt conveyor, and lateral plates are supplied while the connection beams are moving with the belt conveyor. Both are intermittently stopped and have contact surfaces thereof made adhesive and are then pressed together. This process is carried out quite efficiently.

BRIEF DESCRIPTION OF THE DRAWINGS

The advantages of the present invention will become clear from the following detailed description, taken together with the accompanying drawings, in which.

DETAILED DESCRIPTION OF THE INVENTION

Figure 1:
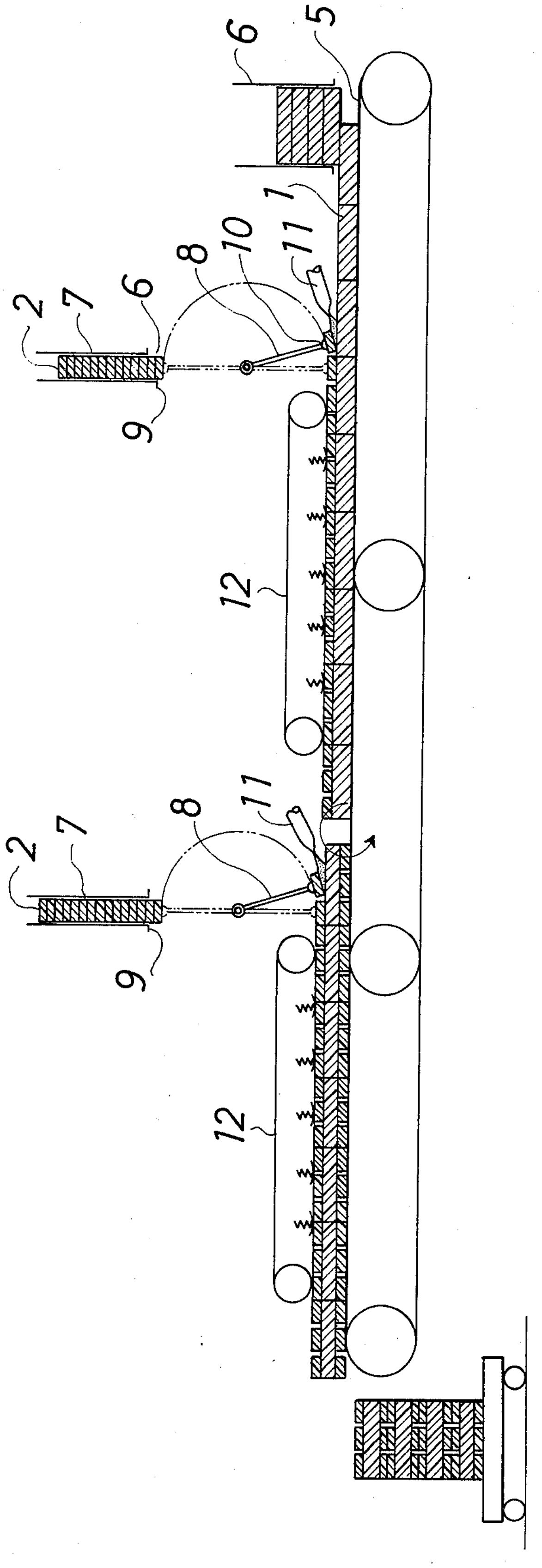
FIG. 1 is a rough profile view of the arrangement of the present invention.
Figure 2:
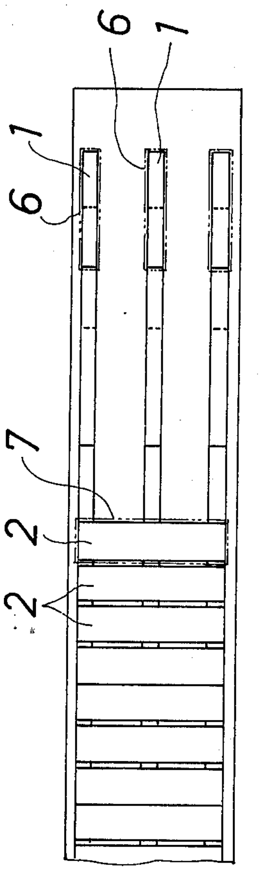
FIG. 2 is a detailed plan of the arrangement of FIG. 1.

In the drawings, and particularly FIGS. 1 and 2, elements 1 are connection beams and elements 2 are lateral plates. Contact surfaces 3 of the members are made from hard and rigid polyethylene, polypropylene, polyvinyl chloride, ABS resin, or other thermoplastic resin materials. Alternatively, the members can be made from materials which can be firmly glued together by appropriate adhesives. Stiffeners 4 can be inserted inside of connection beams 1 and lateral plates 2, if necessary. Various shapes of steel material can be used as stiffeners 4 to meet different requirements. A hopper 6 is arranged above and near the end of belt conveyor 5 which is driven by known means (not shown) in a predetermined intermittent manner and at a predetermined speed. Connection beams 1 are stored in the hopper 6 parallel to the moving direction of conveyor belt 5, and these are supplied to the belt conveyor 5 with an equal space left therebetween. Beams 1 thus move intermittently with belt conveyor 5. A second hopper 7 is arranged at about the middle of the belt conveyor 5. This hopper 7 contains lateral plates 2 which extend perpendicular to the moving direction of the conveyor belt 5. Rotating arm 8 is arranged between opening 9 of the hopper 7 and a connection beam on the belt conveyor 5. This arm can be rotated by any known power source in synchronization with the velocity and intermittent movement of the conveyor 5, and is designed to attract a lateral plate 2 when chuck 10, attached at the top of the arm 8, is positioned at the opening 9 of the hopper 7. The chuck 10 then rotates down to supply the connection beams 1 with a lateral plate 2. Plates 2 are thus supplied to beams 1 at a predetermined angle, e.g., within 30°–60° and preferably 40° to the surface of the beams such that the bottom leading edge of each plate 2 first contacts predetermined positions of respective beams 1 (see FIGS. 1 and 4). At this precise moment conveyor belt 5 stops. Alternatively, the leading edge may contact the beams when the conveyor stops. Arm 8 also preferably stops.

As would be obvious to one skilled in the art, the supplying of the lateral plates can also be accomplished by a rotating gear system or by an inclined gravity system, rather than the rotating arm system.

When conveyor belt 5 and preferably arm 8 are stopped, hot air jet nozzles 11 jet hot air to the contact surfaces 3 of the lateral plate 2 and/or connection beams 1, to slightly melt the surfaces thereof, the melting forming an adhesive or bonding means. In this case, connection beam 1 and lateral plate 2 may be made from the same material, such as polyethylene resin, and can be glued by applying a solution of the same resin thereon. Alternatively, they may be glued by applying other effective chemical solution materials. After the adhesive surfaces are provided, belt 5 and arm 8 are again started, whereby the complete bottom surface of plate 2 is placed in contact with beams 1.

The connection beams and the lateral plates then move between press belt 12 and conveyor belt 5 to attain complete adhesion by pressing.

Figure 3A:
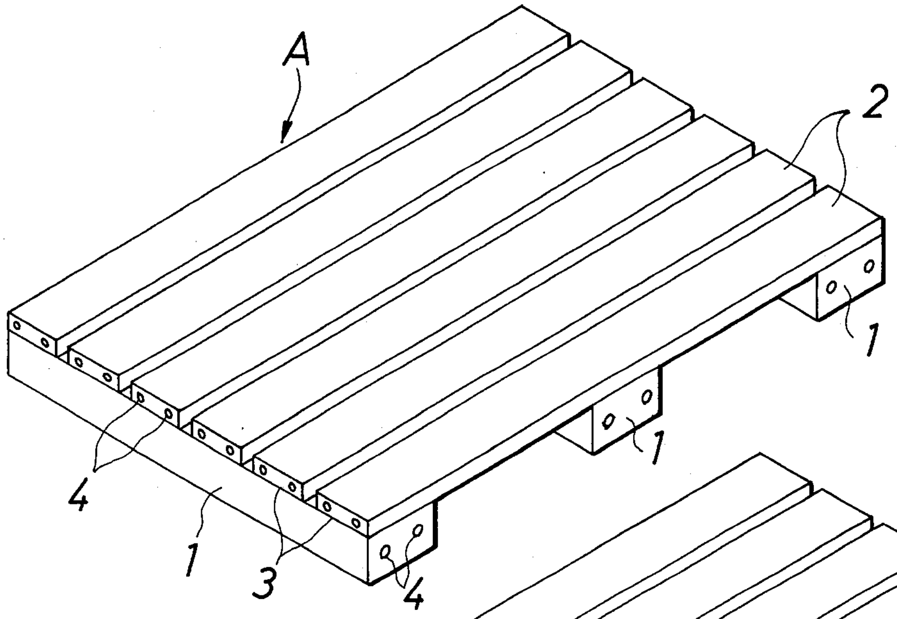
FIGS. 3*a* and 3*b* are perspective views of the finished product.
Figure 3B:
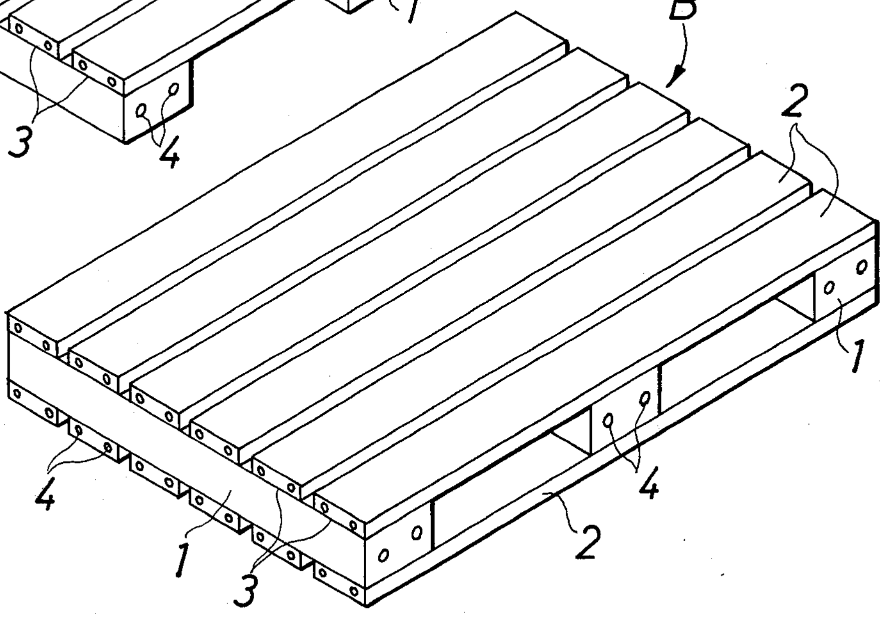

The pressuring time can be adjusted to match the hardening time of the adhesives by controlling the velocity of the conveyor belt 5 or by changing the length of the press belt 12. When heat hardening is necessary, conveyor belt 5 may be surrounded, at least in part, in a hot chamber. This method is capable of producing either frame A or frame B, shown in FIGS. 3*a* and 3*b*. Frame A is taken out after it passes through press belt 12, and therefore lateral plates 2 are glued only on one side of connection beams 1. Frame B, however, has additional lateral plates 2 on the other side of connection beams 1. This is accomplished by turning over frame A by means of a reversion mechanism and sending it back through the apparatus, but without feeding additional beams 1, or by arranging a second rotating arm 8, second hot air jet nozzle 11, and second press belt 12 downstream of the device. Frame A can be used for box frames, concrete casting flasks, etc., and frame B is useful as a freight transportation pallet or the like.

Figure 4:
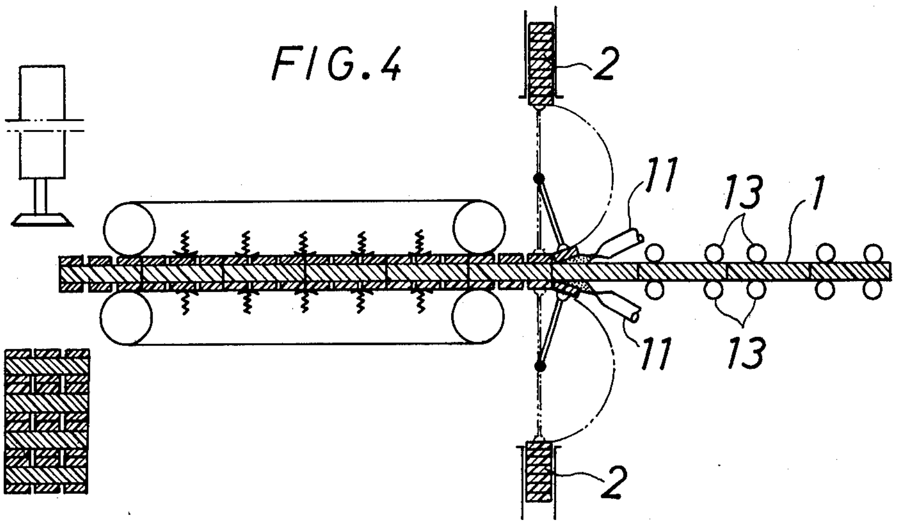
FIG. 4 is a rough profile view of a second embodiment of the invention.

FIG. 4 shows another embodiment for fabricating frame B wherein roller 13 is used for the movement of connection beams 1 instead of belt conveyor 5, so that lateral plates 2 can be glued on both sides of connection beams 1 at the same time.

In this invention, connection beams are first supplied on the belt conveyor, and then lateral plates are supplied to extend perpendicular to the connection beams while they are moving on the conveyor. Such supplying is achieved by intermittent movement of the plates and beams, and respective surfaces thereof are made to be adhesive while the beams and plates are stopped and just before the plates are moved into complete surface contact with the beams on the belt conveyor by a solution of the material or by applying adhesives or chemical solution materials thereto. The advantages of this invention are that the procedure is conducted mechanically with continuous intermittent operation, and thus reinforcement is easily possible to meet the usage requirements of the frame. Also, by having the beams and plates stopped while the contact surfaces thereof are made adhesive, the control of the application of the hot air or the adhesive is much better. That is, it is possible to prevent hot air or adhesive from flowing or jetting beyond the front leading edge of each plate, or onto undesired portions of the beams. As a result, the product is quite durable, relatively inexpensive, and of high quality, and may be used for many different purposes. Especially, the hot air jetted far away will melt the undesired portions. This will result in inequal adhesion at contacts of the plates and beams, which will therefore easily separate.

What is claimed is:

1. A method for fabricating pallets comprising the steps of:

a. placing a plurality of separate and discrete connection beams in parallel at predetermined distances from each other on a conveyor line with the longitudinal dimension of said beams extending in the longitudinal direction of said conveyor line;

b. intermittently moving said conveyor line and said connection beams longitudinally to predetermined positions and stopping said conveyor line and connection beams;

c. intermittently supplying a plurality of lateral plates to said predetermined positions at spaced intervals on one side of the thus intermittently moved beams with said plates extending transversely to the longitudinal dimension of said beams and at a predetermined angle to the surface of said beams, and stopping the movement of said plates before said plates are in full contact with said beams;

d. applying a means for providing an adhesive on the contacting surfaces of at least one of said plates and beams while said beams and plates are stopped;

e. thereafter continuing the intermittent movement of said beams and plates to place said beams and said plates in parallel, immediately thereafter pressing said plates against said beams by a press means, and moving said beams and plates in full contact through said press means under pressure for a desired time to form a secure bond therebetween; and f. releasing the thus bonded beams and plates from said press means, turning the thus released bonded beams and plates over, and repeating steps (b)–(e) to thereby bond further plates at predetermined intervals to the opposite side of said beams.

2. The method of claim 1, further comprising supplying said lateral plates with the said means for providing the adhesive.

3. The method of claim 2, wherein said step of supplying said means comprises jetting a stream of hot air on the surfaces of said connection beams and said lateral plates to slightly melt the surfaces thereof.

4. The method of claim 2, wherein said step of supplying said means comprises applying an adhesive material to the surfaces of said connection beams and said lateral plates.

5. The method of claim 1, wherein said step of intermittently supplying comprises moving said plates into contact, only at the lower leading edge thereof, with said beams.

6. The method of claim 1, wherein said angle is substantially 30°–60°.

7. The method of claim 1, wherein said angle is substantially 40°.

* * * * *